F. WILBAR.
Level.
No. 8,897.
Patented April 20, 1852.
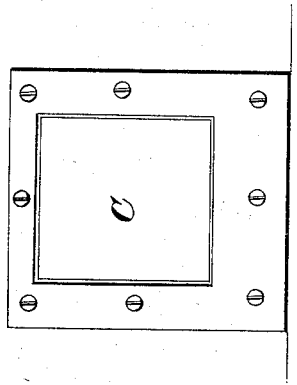
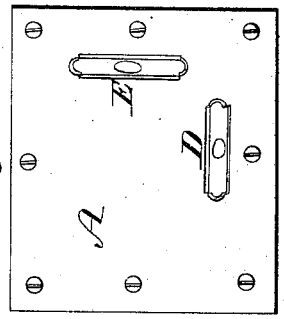
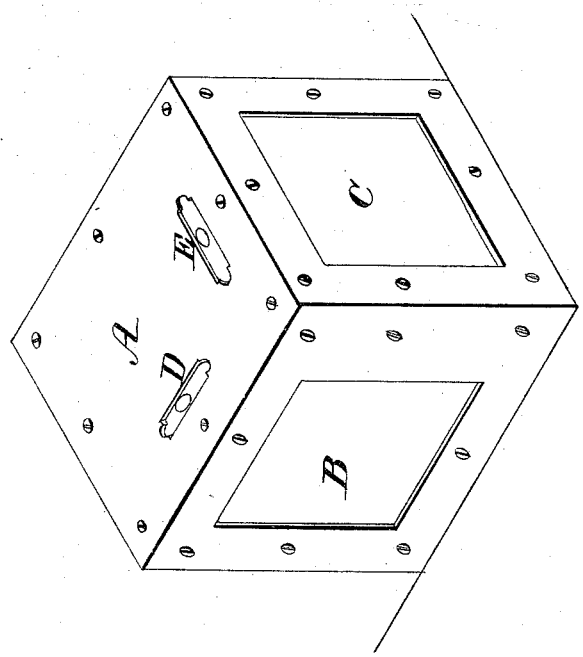

UNITED STATES PATENT OFFICE.

FRANCIS WILBAR, OF ROXBURY, MASSACHUSETTS.

IMPROVED REFLECTING SPIRIT-LEVEL AND SQUARE.

Specification forming part of Letters Patent No. 8,897, dated April 20, 1852.

*To all whom it may concern:*

Be it known that I, FRANCIS WILBAR, of Roxbury, in the county of Norfolk and State of Massachusetts, have invented a new and useful Instrument for Leveling and Squaring, which instrument is particularly valuable for masons, carpenters, or various other mechanics; and I do hereby declare that the same is fully described and represented in the following specification and accompanying drawings, letters, figures, and references thereof.

Of the said drawings, Figure 1 denotes an isometrical perspective view of the aforesaid instrument. Fig. 2 is a top view, and Fig. 3 a side elevation, of it.

The instrument is made as follows—that is to say: I take a cubical block A of wood or other proper material and insert, respectively, in two of its vertical sides standing at right angles to each other two plane-surface reflecting-mirrors B C, whose reflecting-surfaces shall be at a right angle to each other and at the same time be at right angles to the top and bottom surfaces of the block. Within the top of the block I insert two spirit-levels D E, having their axes standing at right angles to each other and so disposed that their air-bubbles may stand in the middle parts of the respective levels whenever the lower surface or bottom of the block is in a horizontal plane, at which time the two reflecting-mirrors B C will each stand in a vertical plane; or instead of such two levels a spherical or crowned disk spirit-level may be used. The instrument so made will be found to be very advantageous for either squaring or leveling work. We will suppose that it is placed on the top surface of a wall that we desire to bring to a level. The instrument or the bottom thereof first being made to stand level by means of the spirit-levels D E, while one of the mirrors is brought so as to stand about at right angles to the direction or line of the wall, we raise or build up the wall until we see by the eye the actual top surface of it range precisely with the reflected image of such surface in the mirror. The top surface of the wall will then be level. We will next suppose that we desire to run off a line or wall square to the wall on which the instrument rests, and to do this from the spot over which the instrument is placed we first move the instrument horizontally until the line of the top edge of the wall is seen in exact range with its reflected image. This done we place one end of a straight line or pole against or near to the other mirror, and, holding the same horizontally or thereabouts we move it until such line or the vertical edge of the pole is seen in range with its reflected image.

Various other examples of the mode of employing the instrument might be explained; but a skillful carpenter, mason or other artisan will readily perceive the general application of it in the arts. One of the mirrors may be so hinged or adapted to the block as to be capable of being turned into any desirable acute or obtuse angle with respect to the other, and then held in position so as to enable a person to lay off a line at either an obtuse or acute angle to another. Suitable contrivances for indicating the number of degrees of such angle may also be added, if desirable. I would remark, however, that I deem the cubical block with its two mirrors and two spirit-levels arranged as seen in the drawings, the most convenient form, and it is this instrument or combination of block or frame, two mirrors, and two spirit-levels, or what is equivalent to the two levels—viz., a spherical surface-level—that I claim as my invention.

In testimony whereof I have hereunto set my signature this 13th day of February A. D. 1852.

FRANCIS WILBAR.

Witnesses:
ALLEN WINSOR,
JOHN I. CLARKE.